Dec. 30, 1958 J. SIMPSON ET AL 2,866,548
INVERTED CAN DETECTING AND POWER CIRCUIT CONTROL MEANS
Filed Jan. 5, 1954 6 Sheets-Sheet 1

INVENTORS
JUSTIN SIMPSON
CHARLES W. HALE
BY
ATTY'S

INVENTORS
JUSTIN SIMPSON
CHARLES W. HALE

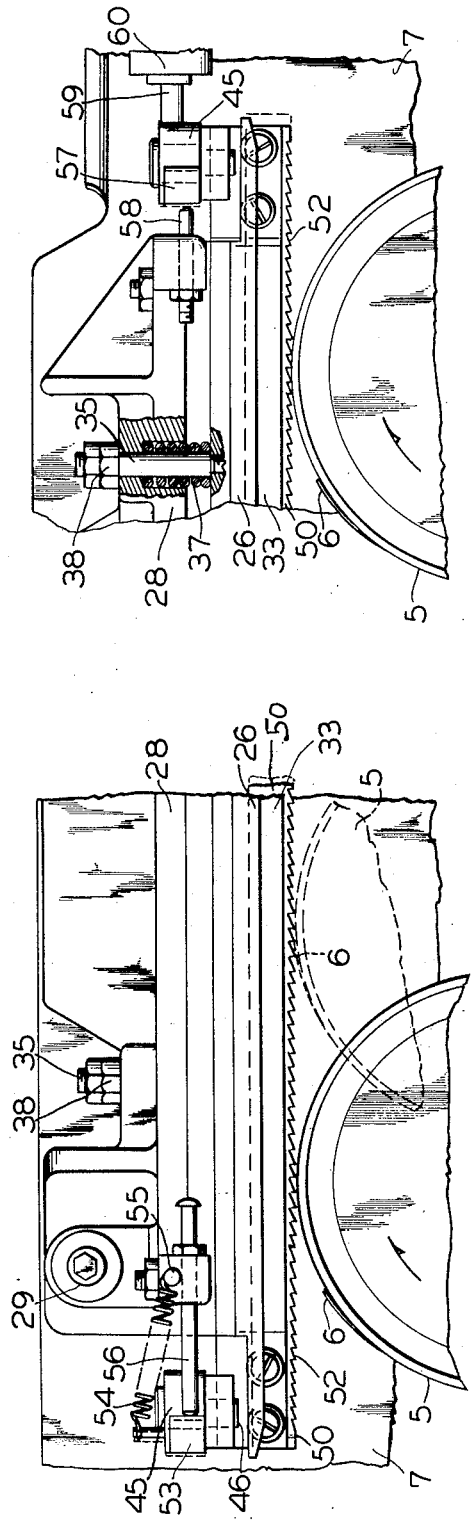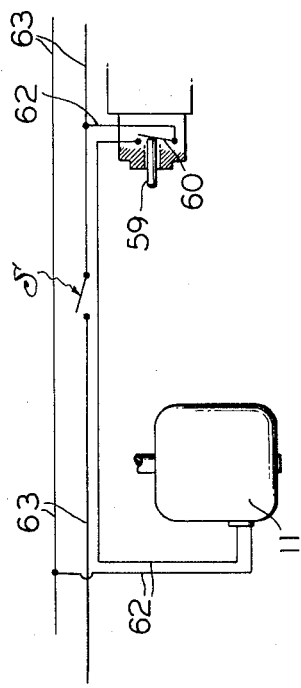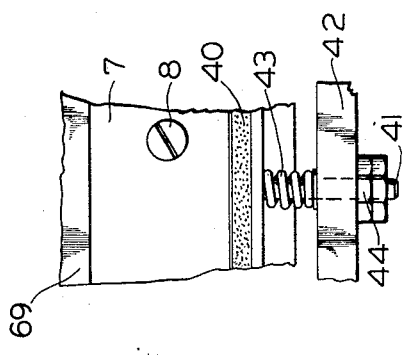

Dec. 30, 1958   J. SIMPSON ET AL   2,866,548
INVERTED CAN DETECTING AND POWER CIRCUIT CONTROL MEANS
Filed Jan. 5, 1954   6 Sheets-Sheet 4
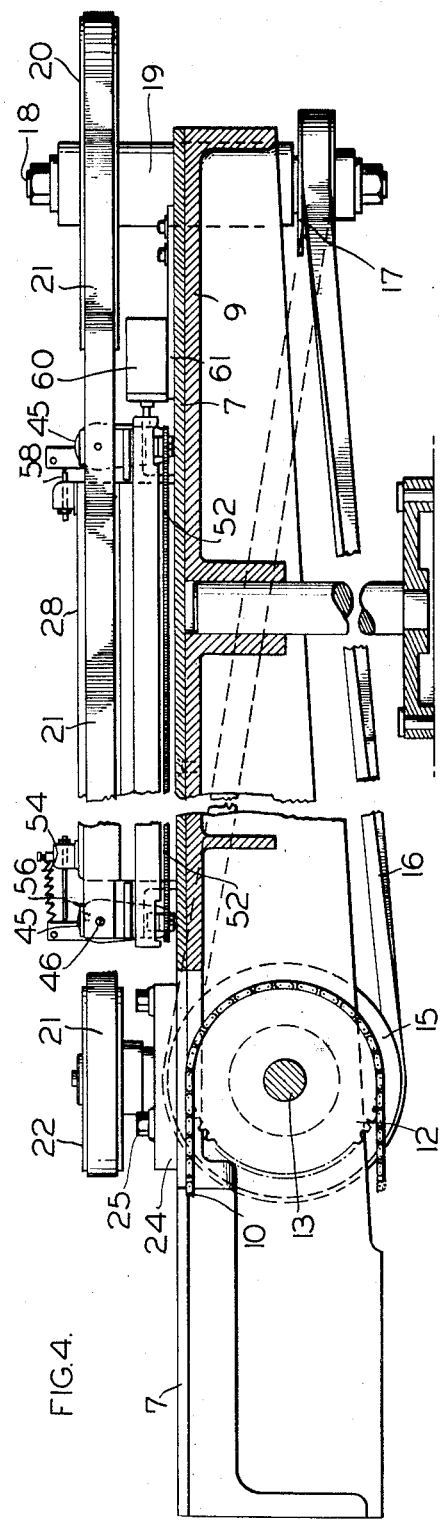
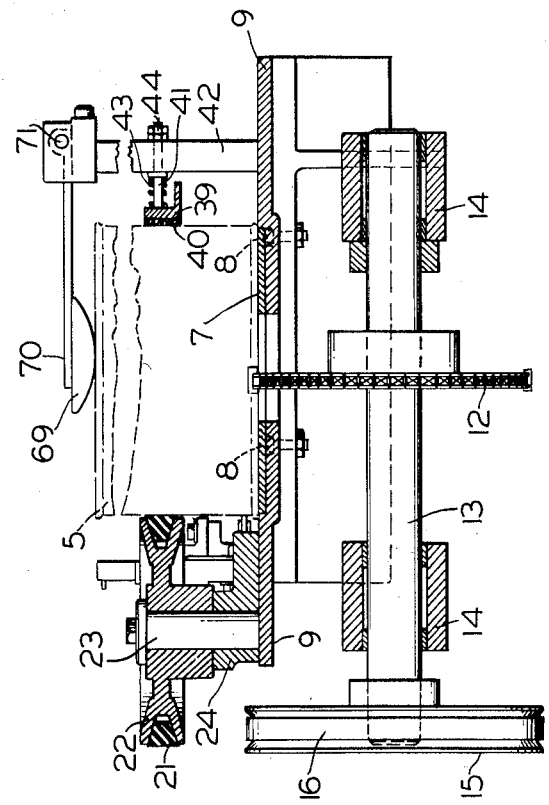
INVENTORS
JUSTIN SIMPSON
CHARLES W. HALE
BY
ATTYS Dec. 30, 1958    J. SIMPSON ET AL    2,866,548
INVERTED CAN DETECTING AND POWER CIRCUIT CONTROL MEANS
Filed Jan. 5, 1954    6 Sheets-Sheet 5

INVENTORS
JUSTIN SIMPSON
CHARLES W. HALE
BY
ATTY'S

Dec. 30, 1958    J. SIMPSON ET AL    2,866,548
INVERTED CAN DETECTING AND POWER CIRCUIT CONTROL MEANS
Filed Jan. 5, 1954    6 Sheets-Sheet 6
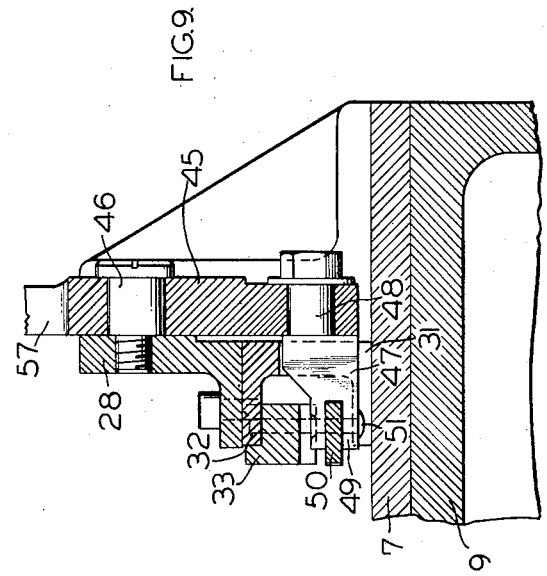
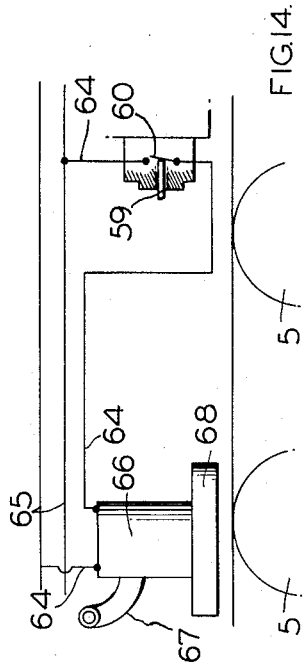
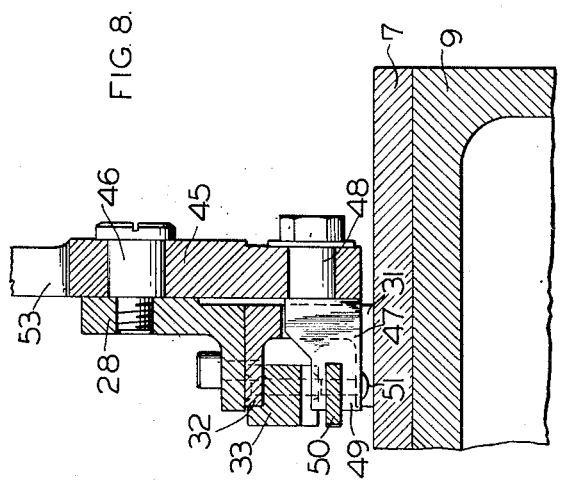
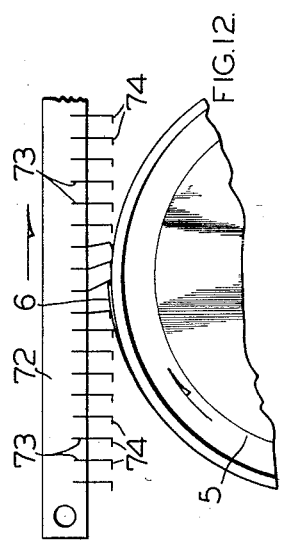
INVENTORS
JUSTIN SIMPSON
CHARLES W. HALE
BY
Mason, Porter, Diller & Stewart
ATTY'S

United States Patent Office 2,866,548
Patented Dec. 30, 1958

2,866,548

INVERTED CAN DETECTING AND POWER CIRCUIT CONTROL MEANS

Justin Simpson, Elmhurst, and Charles W. Hale, Oak Park, Ill., assignors to Continental Can Company, Inc., New York, N. Y., a corporation of New York Application January 5, 1954, Serial No. 402,372

14 Claims. (Cl. 209—72)

The invention relates generally to the art of manufacturing cans, and more particularly to the feeding of collar cans having tear strips embodied therein, and it primarily seeks to provide a novel means for detecting cans which are being fed along in inverted position and for controlling a power circuit to bring about a stopping of a motor operating to feed the cans or for other purposes, or for bringing about actuation of an inverted can ejecting means.

Collar cans are extensively used in the packaging of products of which coffee and shortening are examples, and in each such can body opposite the collar mounted internally adjacent one end is a tear strip having a free tongue projecting outwardly very slightly beyond the can body wall and adapted to receive a key about which it can be wound to tear the tear strip out of the body and open the can, leaving the collar projecting endwise from the remainder of the body as a part of a reclosure means. It sometimes happens that such a collar can will be fed along a feed line in inverted position, that is with its tear strip adjacent the bottom instead of the top, usually because the can has been hand picked off the line for inspection and improperly replaced. It will be apparent that cans must not be permitted to continue along the line in an inverted position because subsequent operations thereon would be improperly performed, such as beading, or the insertion of collars in upper end portions of the cans whereas the tear strips therein are at the lower ends because of the cans having been inverted. It is a purpose of the present invention to provide novel means for feeding the cans uprightly and in processional order, and for rotating them about their axes as they are being moved along, a power control circuit including a control switch, and a switch actuater engageable and movable by contact of the tear strip tongue of a can moving along in inverted position and effective when so moved to actuate the switch to control the power circuit.

Another object of the invention is to provide an apparatus of the character stated wherein the means for feeding and rotating the cans includes a travelling belt flight engaging the procession of cans at one side, and spring pressed friction bar means engaging the cans at their opposite sides and yieldably pressing them against the belt flight.

Another object of the invention is to provide an apparatus of the character stated wherein the switch actuater comprises a horizontally disposed longitudinally extending and shiftable bar having a toothed face presented at the level of a tear strip tongue on a can moving along in inverted position so that such a tongue will rotate against and impart longitudinal movement to the bar effective to bring about a circuit controlling actuation of the switch.

Another object of the invention is to provide an apparatus of the character stated wherein the actuator bar has flexible teeth projecting therefrom in position for being engaged by the projecting tear strip tongues of inverted cans and terminating in hooked end portions facilitating bar shifting engagement with said tongues but which are free to flex in a manner for permitting free passage of the cans travelling in normal upright position without scratching the outside of the can bodies.

Another object of the invention is to provide an apparatus of the character stated wherein the actuater bar is pivotally mounted on supporting members which are in turn swingably mounted, there being included stop means for determining the normal position of the bar, and spring means for yieldably holding the parts at the stop engaging position until they are moved away by an inverted can tear strip tongue contact, and for again returning said parts to said stop engaging position after a displacement by such a tongue contact.

Another object of the invention is to provide an apparatus of the character stated wherein the control switch is connected to control a circuit in which the motor effective to drive the can feed is included so that actuation of the switch will bring about a stopping of the motor and a discontinuation of the feeding of cans.

Another object of the invention is to provide an apparatus of the character stated wherein the control switch is connected to bring about an actuation of an ejecting means for ejecting an inverted can which has caused the switch to be actuated.

With the above and other objects in view that will hereinafter appear, the nature of the invention will be more clearly understood by reference to the following detailed description, the appended claims and the several views illustrated in the accompanying drawings.

In the drawings:

Figure 2 is a fragmentary plan view illustrating the advance end mounting of the actuater bar, a shifting of the bar by tear strip tongue contact being indicated in dotted lines.

Figure 3 is a fragmentary plan view similar to Figure 2 and illustrating the other end mounting of the actuater bar and the control switch which is actuated thereby.

Figure 4 is a central vertical longitudinal section looking toward the can rotating belt flight.

Figure 5 is a vertical cross section taken on the line 5—5 on Figure 1.

Figure 7 is a view similar to Figure 6 illustrating the bar end mounting of Figure 3, the section being taken on the line 7—7 on Figure 1a.

Figure 8 is a detail vertical cross section taken on the line 8—8 on Figure 6.

Figure 9 is a detail vertical cross section taken on the line 9—9 on Figure 7.

Figure 10 is an enlarged fragmentary vertical cross section taken on the line 10—10 on Figure 1a.

Figure 11 is an enlarged fragmentary plan view illustrating the mounting of one of the backing springs for the can engaging friction bar means.

Figure 12 is a fragmentary plan view illustrating a modified form of actuater bar having flexible teeth projecting therefrom for engagement by the tear strip tongues of cans travelling in inverted position.

Figure 13 is a diagrammatic view showing the control switch connected as a feed drive motor stopping means.

Figure 14 is a diagrammatic view showing the control switch connected for controlling an inverted can ejecting means in the form of an air blast.

Figure 1:
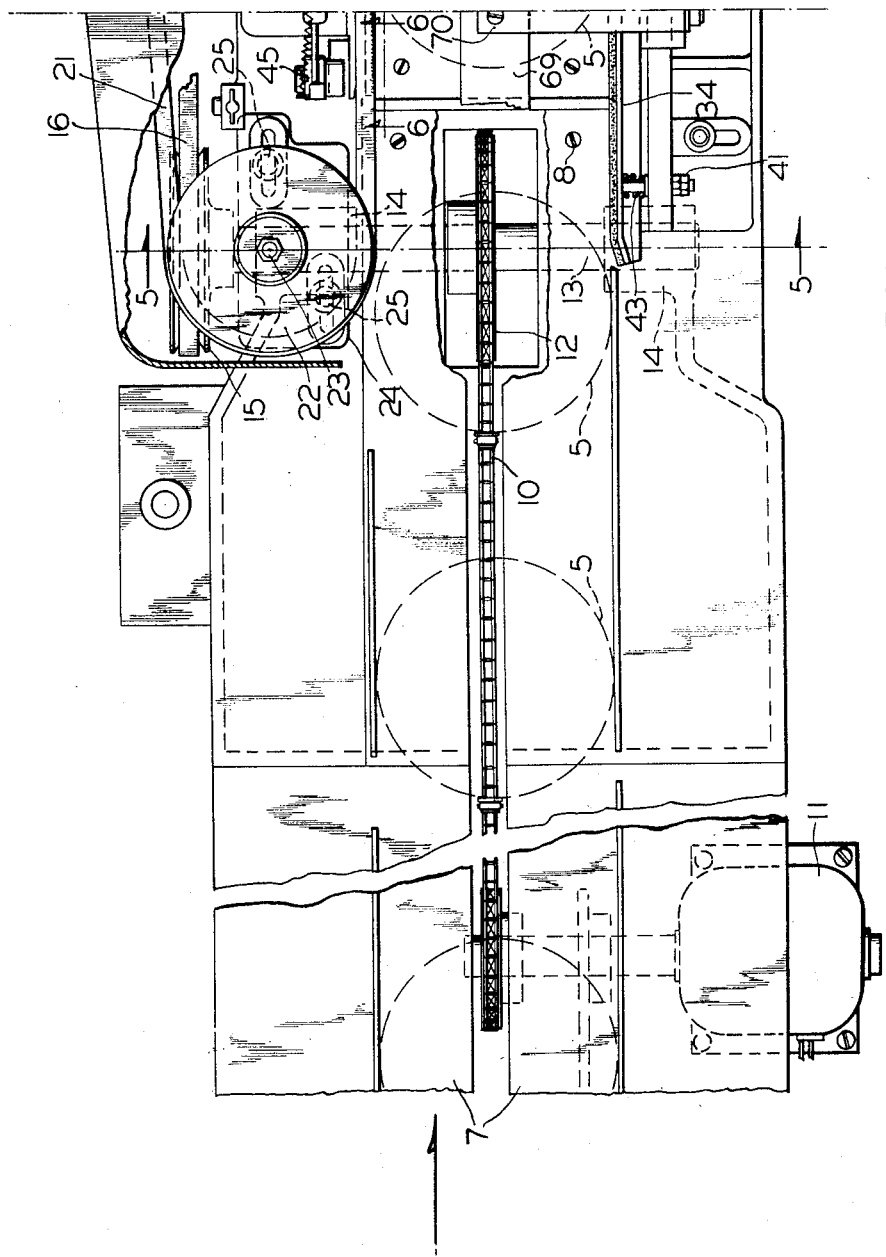
Figure 1 is a fragmentary plan view.

In the example of embodiment of the invention herein disclosed, the cans 5 including the tear strips with slightly projecting tongues 6 are fed along in upright position and in processional order over feedway plates 7 which are secured at 8 on the supporting bed 9. The cans are fed along by a chain 10 which may be driven in any approved manner, as by drive means including the driving motor 11 as shown in Figure 1.

The chain 10 passes over a sprocket 12 secured on a cross shaft 13 and is rotatable in bearing means 14 provided therefor on the machine bed, and said cross shaft also has a driving pulley 15 mounted thereon. A twisted belt 16 passes over the pulley 15 and over a pulley 17 secured on the lower end of an upright shaft 18 which is rotatable in bearing means 19 supported on the machine bed. See Figures 1, 1a and 4. A driving pulley 20 is secured on the upper end of the upright shaft 18, and a can rotating belt 21 passes over said pulley 20 and over an idler pulley 22 which is rotatable about a stud 23 projecting upwardly from a supporting bracket 24 which is longitudinally-adjustably supported as at 25 on the machine bed.

Figure 1A:
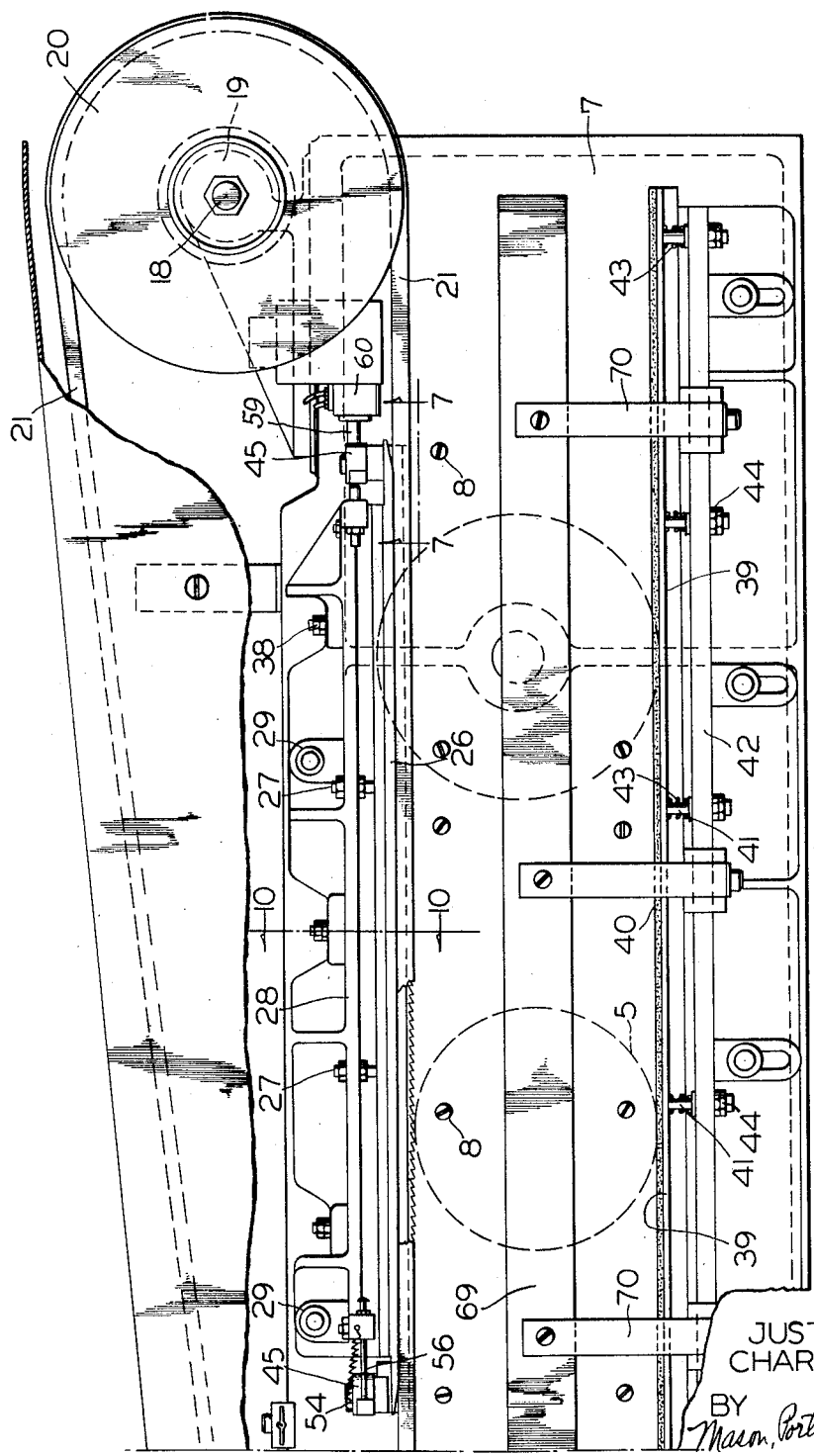
Figure 1a is a fragmentary plan view, and these two figures considered together in slightly overlapped relation illustrate the whole of the improved apparatus, parts being broken away and in section.
Figure 7:
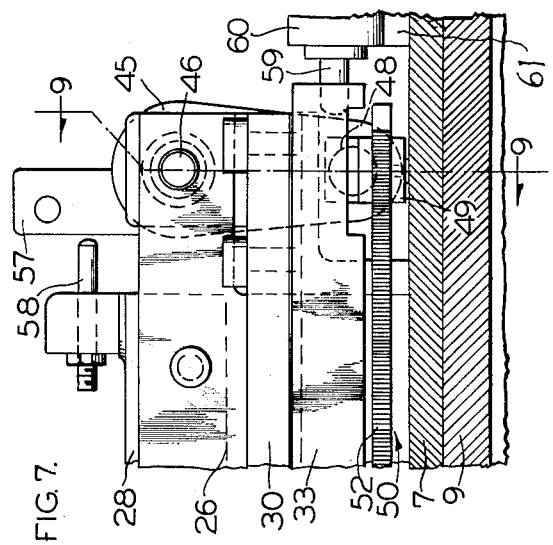
Figure 10:
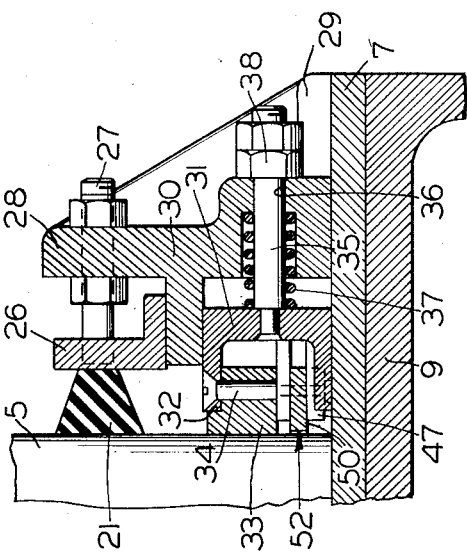

It will be apparent by reference to Figures 1 and 1a that one flight of the belt 21 parallels the path of travel of the cans, and this belt flight is backed up by a bar 26 which is adjustably supported at 27 on a longitudinal bracket 28 secured as at 29 on the machine bed. See Figure 10.

The bracket 28 includes a horizontal web portion 30 beneath which a U-member 31 is slidable, said U-member being disposed with its base in upright position and its legs horizontal and directed toward the can feedway. The upper leg 32 of the U-member has a can presser bar means 33 secured thereto as at 34 in position for engaging the cans as they are being rolled along by the effective flight of the belt 21. The U-member 31 and the bar 33 are spring pressed toward the cans, the U-member being equipped with plungers 35 which project through apertures 36 in the bracket 28, and compression springs 37 being interposed between said U-member and the bracket in the manner clearly illustrated in Figure 10. Movement of the presser bar 33 toward the cans, or the can feedway, is limited by the adjustable abutments 38 mounted on the plungers in position for engaging the bracket 28. The bar means 33 and the overlying can rotating flight of the belt 21 are opposed at the other side of the can feedway by a presser bar means 39 equipped with friction facing 40. See Figures 1, 1a and 5. This bar means 39, 40 also is equipped with plungers 41 projecting through apertures in the longitudinal bracket 42 which is laterally-adjustably secured on the machine bed, and compression springs 43 interposed between the presser bar means 39, 40 and the bracket 42 serve to constantly press the bar means toward the travelling cans, movement of the bar means toward the cans being limited by the abutments 44 adjustably mounted on the plungers 41 and engaging the bracket 42. It will be readily apparent that the cans 5, frictionally engaging the bar means facing 40 at one side, and being engaged by the travelling belt 21 at the opposite side will be rotated about their upright axes as they are moved along over the machine bed.

Two upright connector arms 45 are pivotally supported on horizontal pivot pins 46 secured at the respective ends of the bracket carrier bar 26 as illustrated in Figures 1, 1a, 2, 3 and 6 through 9. An actuater bar carrier 47 is pivotally mounted at 48 at the lower end of each arm 45, and each carrier 47 includes a forked end 49 presented toward the can feedway and in which an end of an actuater bar 50 is secured as at 51. It will be noted by reference to Figure 10 that the actuater bar 50 is partially housed within the U-member 31, and said bar has a toothed face 52 which is presented toward the can feedway and at a level for being contacted by the tear strip tongue extensions of all cans which may be fed along over the machine bed in inverted position. It is to be understood that when cans are so fed in inverted position, the tear strip tongue projections 6 will rotate in a clockwise direction in a manner indicated in Figures 2 and 3.

Figure 6:
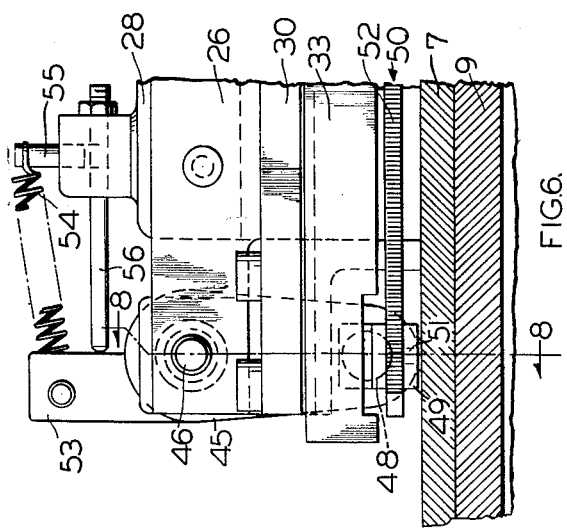
Figure 6 is an enlarged fragmentary vertical longitudinal section illustrating the bar end mounting of Figure 2, the section being taken on the line 6—6 on Figure 1.

The carrier arm 45 disposed at the advance end of the feedway has an upward extension 53 to which a retractile spring 54 is connected, said spring being anchored at 55 to the bracket 28 and serving to hold the extension against an adjustably mounted stop 56 carried by the bracket 28 in the manner clearly illustrated in Figures 2 and 6 of the drawings. The other arm 45 has an upward extension 57 opposed by a movement limiting stop 58 adjustably supported on the bracket 28 in the manner clearly illustrated in Figures 3 and 7. It is to be understood that whenever the arm extension 53 is in its normal position against the stop 56, the arm extension 57 will be slightly spaced from the stop 58 so as to permit a limited amount of swinging movement of the arms 45 and a longitudinal shifting of the bar 50, 52 in the direction in which the cans are moving. The lower end of the arm 45 having the projection 57 lies close to the actuater button 59 of a power circuit control switch 60 which is supported at 61 on the machine bed.

It is to be understood that the actuater bar 50, 52 is of a length at least as long as the circumference of cans which are being fed along the feedway. Thus it is assured that every can rolling along the feedway between the presser bar means 39, 40 and the opposing flight of the belt 21 will have at least one complete rotation imparted thereto while passing along the distance from end to end of the actuater bar 50, 52, thus assuring that the tear strip tongue projection 6 of every can which is being fed along in inverted position will contact and impart limited longitudinal shifting movement to the actuater bar 50, 52. This shifting movement of the actuater bar will be limited by the stop 58, but the movement will be sufficient to actuate the switch 60 and cause it to perform its circuit controlling function.

The control switch connection and operation is optional. It may be connected to bring about a stopping of the motor which drives the can feeding means, or it may be connected to bring about actuation of a can ejecting means effective to eject the can which is being fed in inverted position or it can accomplish other purposes. In Figure 13 of the drawings there is diagrammatically illustrated an arrangement in which the control switch 60 is connected by conductors 62 with the motor 11 and with the power lines 63 so that a pressing of the switch button 59 will open the switch and bring about a stopping of the feeding of the cans. It is to be understood that the switch S diagrammatically indicated in Figure 13 constitutes a conventional form of push button starter switch which includes a "hold in" relay. When the circuit is broken to the relay by actuation of the switch button 59 in the manner just described, the solenoid releases the contact in the switch S so that the motor cannot be started again until the push button switch S is manually actuated to complete the circuit and energize the relay effective to hold the switch terminals in contact during the continued operation of the motor.

In Figure 14 of the drawings the control switch 60 is shown as connected by conductors 64 with the power supply lines 65 and with a magnetic valve 66 for controlling flow of air under pressure from the supply line 67 to a can ejecting blast device 68 for the purpose of bringing about an ejection of a can travelling in an inverted position.

If desired a can hold down bar 69 may be provided and supported by arms 70 which are pivotally supported as at 71 in position for having the bar 69 rest upon cans as they are being moved along between the belt 21 and the opposing friction bar means 40. The bar 69 may be swung up out of the way to allow removal of an improperly positioned can when the machine is stopped as soon as the tongue of an inverted can encounters the toothed bar and breaks the circuit to the driving motor.

In Figure 12 of the drawings, there is illustrated a modified form of actuator bar in which the bar 72 is equipped with equidistantly spaced flexible fingers 73 having hook end portions 74 presented for engagement by the projecting tear strip tongue 6 of any can which is being fed along in inverted position. It will be apparent by reference to Figure 12 that the projecting tongue 6 of a can 5 being moved along in inverted position and rotated in the manner indicated in the figure will contact the hooked ends 74 of the fingers 73 in a manner for imparting the desired longitudinal shifting movement to the bar 72.

While example illustrations of the apparatus of the invention are given herein, it is to be understood that the structure of the apparatus can be varied without departing from the spirit and scope of the invention as defined in the appended claims.

We claim:

1. In apparatus of the character described, means for feeding cans uprightly and in processional order, said cans each having a tear strip adjacent one end thereof and terminating at one point in the circumference thereof in a free tongue end portion projecting slightly outwardly from the periphery of the can, a power control circuit including a control switch, a switch actuater engageable and movable by contact of the tear strip tongue of a can moving along in inverted position and effective when so moved to actuate the switch to control the power circuit, and means for assuring presentation against said actuater, and in the direction of its projection from the can, of the slightly projecting tongue of each can which may be fed along in inverted position, said switch actuater comprising a longitudinally shiftable bar having a toothed face disposed at the level along which the tear strips of inverted cans will travel and being effective when longitudinal movement is imparted thereto by tear strip tongue contact with said toothed face to bring about an actuation of the switch.

2. In apparatus of the character described, means for feeding cans uprightly and in processional order, said cans each having a tear strip adjacent one end thereof and terminating at one point in the circumference thereof in a free tongue end portion projecting slightly outwardly from the periphery of the can, a power control circuit including a control switch, a switch actuater engageable and movable by contact of the tear strip tongue of a can moving along in inverted position and effective when so moved to actuate the switch to control the power circuit, and means for assuring presentation against said actuater, and in the direction of its projection from the can, of the slightly projecting tongue of each can which may be fed along in inverted position, said switch actuater comprising a longitudinally shiftable bar having a toothed face disposed at the level along which the tear strips of inverted cans will travel and being effective when longitudinal movement is imparted thereto by tear strip tongue contact with said toothed face to bring about an actuation of the switch, said bar being at least as long as the circumference of a can and the tongue presentation assuring means comprising means for imparting rotation to the cans as they are being moved along so as to assure contact with said toothed bar face of the tear strip tongue of any can which is moving along in inverted position.

3. In apparatus of the character described, means for feeding cans uprightly and in processional order, said cans each having a tear strip adjacent one end thereof and terminating at one point in the circumference thereof in a free tongue end portion projecting slightly outwardly from the periphery of the can, a power control circuit including a control switch, a switch actuater engageable and movable by contact of the tear strip tongue of a can moving along in inverted position and effective when so moved to actuate the switch to control the power circuit, and means for assuring presentation against said actuater, and in the direction of its projection from the can, of the slightly projecting tongue of each can which may be fed along in inverted position, said control circuit being operatively connected with an inverted can ejecting means effective when the switch is actuated to bring about an ejecting of the inverted can which caused actuation of the switch.

4. In apparatus of the character described, means for feeding cans uprightly and in processional order, said cans each having a tear strip adjacent one end thereof and terminating at one point in the circumference thereof in a free tongue end portion projecting slightly outwardly from the periphery of the can, a power control circuit including a control switch, a switch actuater engageable and movable by contact of the tear strip tongue of a can moving along in inverted position and effective when so moved to actuate the switch to control the power circuit, and means for assuring presentation against said actuater, and in the direction of its projection from the can, of the slightly projecting tongue of each can which may be fed along in inverted position, there also being included an electrically controlled air blast means connected in the control circuit and disposed to blow cans off the feed line when the switch is actuated so as to bring about an ejection of an inverted can causing actuation of the switch.

5. In apparatus of the character described, means for feeding cans uprightly and in processional order, said cans each having a tear strip adjacent one end thereof and terminating at one point in the circumference thereof in a free tongue end portion projecting slightly outwardly from the periphery of the can, a power control circuit including a control switch, a switch actuater engageable and movable by contact of the tear strip tongue of a can moving along in inverted position and effective when so moved to actuate the switch to control the power circuit, and means for assuring presentation against said actuater, and in the direction of its projection from the can, of the slightly projecting tongue of each can which may be fed along in inverted position, said tongue presentation assuring means comprising means for imparting rotation to the cans as they are being moved along so as to assure contact with the switch actuater of the tear strip tongue of any can which is moving along in inverted position, said can rotating means including a travelling belt disposed to present one flight thereof in rotation imparting contact with the travelling cans along one side thereof, and spring pressed friction bar means engaged by the cans at their opposite sides and yieldably pressing the cans against said belt flight.

6. In apparatus of the character described, means for feeding cans uprightly and in processional order, said cans each having a tear strip adjacent one end thereof and terminating at one point in the circumference thereof in a free tongue end portion projecting slightly outwardly from the periphery of the can, a power control circuit including a control switch, a switch actuater engageable and movable by contact of the tear strip tongue of a can moving along in inverted position and effective when so moved to actuate the switch to control the power circuit, and means for assuring presentation against said actuater, and in the direction of its projection from the can, of the slightly projecting tongue of each can which may be fed along in inverted position, said switch actuater comprising a longitudinally shiftable bar having a toothed face disposed at the level along which the tear strips of inverted cans will travel and being effective when longitudinal movement is imparted thereby by tear strip tongue contact with said toothed face to bring about an actuation of the switch, said bar being at least as long as the circumference of a can and the tongue presentation assuring means comprising means for imparting rotation to the cans as they are being moved along so as to assure contact with said toothed bar face of the tear strip tongue of any can which is moving along in inverted position, said can rotating means including a travelling belt disposed to present one flight thereof in rotation imparting contact with the travelling cans along one side thereof, and spring pressed friction bar means engaged by the cans at their opposite sides and yieldably pressing the cans against said belt flight.

7. In apparatus of the character described, means for feeding cans uprightly and in processional order, said cans each having a tear strip adjacent one end thereof and terminating at one point in the circumference thereof in a free tongue end portion projecting slightly outwardly from the periphery of the can, a power control circuit including a control switch, a switch actuater engageable and movable by contact of the tear strip tongue of a can moving along in inverted position and effective when so moved to actuate the switch to control the power circuit, and means for assuring presentation against said actuater, and in the direction of its projection from the can, of the slightly projecting tongue of each can which may be fed along in inverted position, said tongue presentation assuring means comprising means for imparting rotation to the cans as they are being moved along so as to assure contact with the switch actuater of the tear strip tongue of any can which is moving along in inverted position, said can rotating means including a travelling belt disposed to present one flight thereof in rotation imparting contact with the travelling cans along one side thereof, and spring pressed friction bar means engaged by the cans at their opposite sides and yieldably pressing the cans against said belt flight, and there also being included a rigidly supported bar backing up and definitely placing said belt flight.

8. In apparatus of the character described, means for feeding cans uprightly and in processional order, said cans each having a tear strip adjacent one end thereof and terminating at one point in the circumference thereof in a free tongue end portion projecting slightly outwardly from the periphery of the can, a power control circuit including a control switch, a switch actuater engageable and movable by contact of the tear strip tongue of a can moving along in inverted position and effective when so moved to actuate the switch to control the power circuit, and means for assuring presentation against said actuater, and in the direction of its projection from the can, of the slightly projecting tongue of each can which may be fed along in inverted position, said tongue presentation assuring means comprising means for imparting rotation to the cans as they are being moved along so as to assure contact with the switch actuater of the tear strip tongue of any can which is moving along in inverted position, said can rotating means including a travelling belt disposed to present one flight thereof in rotation imparting contact with the travelling cans along one side thereof, and spring pressed friction bar means engaged by the cans at their opposite sides and yieldably pressing the cans against said belt flight, and there also being included a second spring pressed bar means paralleling the first mentioned spring pressed bar means and pressing against the sides of the cans engaged by said belt flight.

9. In apparatus of the character described, means for feeding cans uprightly and in processional order, said cans each having a tear strip adjacent one end thereof and terminating at one point in the circumference thereof in a free tongue end portion projecting slightly outwardly from the periphery of the can, a power control circuit including a control switch, a switch actuator engageable and movable by contact of the tear strip tongue of a can moving along in inverted position and effective when so moved to actuate the switch to control the power circuit, and means for assuring presentation against said actuater, and in the direction of its projection from the can, of the slightly projecting tongue of each can which may be fed along in inverted position, said tongue presentation assuring means comprising means for imparting rotation to the cans as they are being moved along so as to assure contact with the switch actuater of the tear strip tongue of any can which is moving along in inverted position, said can rotating means including a travelling belt disposed to present one flight thereof in rotation imparting contact wtih the travelling cans along one side thereof, and spring pressed friction bar means engaged by the cans at their opposite sides and yieldably pressing the cans against said belt flight, and there also being included a longitudinal U-member disposed with the base of the U upright and the legs of the U horizontally and the hollow of the U opening toward the travelling cans and at least partially enclosing the switch actuater, spring means pressing the U-member toward the travelling cans, and a presser bar carried by the U-member in position for engaging said cans.

10. In apparatus of the character described, means for feeding cans uprightly and in processional order, said cans each having a tear strip adjacent one end thereof and terminating at one point in the circumference thereof in a free tongue end portion projecting slightly outwardly from the periphery of the can, a power control circuit including a control switch, a switch actuater engageable and movable by contact of the tear strip tongue of a can moving along in inverted position and effective when so moved to actuate the switch to control the power circuit, and means for assuring presentation against said actuater, and in the direction of its projection from the can, of the slightly projecting tongue of each can which may be fed along in inverted position, said switch actuater comprising a shiftably mounted bar having a longitudinal face disposed along the can feedway at the level along which the tear strips of inverted cans will travel and being effective when longitudinal movement is imparted thereto by tear strip tongue contact with said toothed face to bring about an actuation of the switch, and there being included two upright pivotally mounted arms supporting the actuater bar, stop means for limiting movement of the actuater bar in a direction opposite the switch actuating direction, and spring means for yieldably urging the actuater bar in the stop engaging direction.

11. In apparatus of the character described, means for feeding cans uprightly and in processional order, said cans each having a tear strip adjacent one end thereof and terminating at one point in the circumference thereof in a free tongue end portion projecting slightly outwardly from the periphery of the can, a power control circuit including a control switch, a switch actuater engageable and movable by contact of the tear strip tongue of a can moving along in inverted position and effective when so moved to actuate the switch to control the power circuit, and means for assuring presentation against said actuater, and in the direction of its projection from the can, of the slightly projecting tongue of each can which may be fed along in inverted position, said switch actuater comprising a shiftably mounted bar having a longitudinal face disposed along the can feedway at the level along which the tear strips of inverted cans will travel and being effective when longitudinal movement is imparted thereto by tear strip tongue contact with said toothed face to bring about an actuation of the switch, and there being included two upright pivotally mounted arms supporting the actuater bar, stop means for limiting movement of the actuater bar in a direction opposite the switch actuating direction, and spring means for yieldably urging the actuater bar in the stop engaging direction, a longitudinal U-member disposed with the base of the U upright and the legs of the U horizontally and the hollow of the U opening toward the travelling cans and at least partially enclosing the actuater bar, spring means pressing the U-member toward the travelling cans, and a presser bar carried by the U-member in position for engaging said cans.

12. In apparatus of the character described, means for feeding cans uprightly and in processional order, said cans each having a tear strip adjacent one end thereof and terminating at one point in the circumference thereof in a free tongue end portion projecting slightly outwardly from the periphery of the can, a power control circuit including a control switch, a switch actuater engageable and movable by contact of the tear strip tongue of a can moving along in inverted position and effective when so moved to actuate the switch to control the power circuit, and means for assuring presentation against said actuater, and in the direction of its projection from the can, of the slightly projecting tongue of each can which may be fed along in inverted position, said switch actuater comprising a shiftably mounted bar having a longitudinal face disposed along the can feedway at the level along which the tear strips of inverted cans will travel and equipped with flexible teeth projecting therefrom in position for being engaged by the projecting tear strip tongues of inverted cans and terminating in hooked end portions facilitating bar shifting engagement with said tongues but which are free to flex in a manner for permitting free passage of cans travelling in normal upright position without scratching the outside of the can bodies.

13. In apparatus of the character described, means for feeding cans uprightly and in processional order, said cans each having a tear strip adjacent one end thereof and terminating at one point in the circumference thereof in a free tongue end portion projecting slightly outwardly from the periphery of the can, a power control circuit including a control switch, a switch actuater engageable and movable by contact of the tear strip tongue of a can moving along in an inverted position and effective when so moved to actuate the switch to control the power circuit, and means for assuring presentation against said actuater, and in the direction of its projection from the can, of the slightly projecting tongue of each can which may be fed along in inverted position, said switch actuater comprising a shiftably counted bar having a longitudinal face disposed along the can feedway at the level along which the tear strips of inverted cans will travel and equipped with flexible teeth projecting therefrom in position for being engaged by the projecting tear strip tongues of inverted cans and terminating in hooked end portions facilitating bar shifting engagement with said tongues but which are free to flex in a manner for permitting free passage of cans travelling in normal upright position without scratching the outside of the can bodies, said flexible teeth being of a length for projecting from the bar a distance for actually contacting and brushing about each can body periphery so as to make certain of the desired contact of the hooked end portions with tongues on inverted cans.

14. In apparatus of the character described, means for feeding cans uprightly and in processional order, said cans each having a tear strip adjacent one end thereof and terminating at one point in the circumference thereof in a free tongue end portion projecting slightly outwardly from the periphery of the can, a power control circuit including a control switch, a switch actuater engageable and movable by contact of the tear strip tongue of a can moving along in inverted position and effective when so moved to actuate the switch to control the power circuit, and means for assuring presentation against said actuater, and in the direction of its projection from the can, of the slightly projecting tongue of each can which may be fed along in inverted position, said switch actuater comprising a longitudinally shiftable bar having a toothed face disposed at the level along which the tear strips of inverted cans will travel and being effective when longitudinal movement is imparted thereto by tear strip tongue contact with said toothed face to bring about an actuation of the switch, said bar being at least as long as the circumference of a can and the tongue presentation assuring means comprising means for imparting rotation to the cans as they are being moved along so as to assure contact with said toothed bar face of the tear strip tongue of any can which is moving along in inverted position, and there being included stop means for determining the normal or at rest position of the bar, spring means for yieldably retaining the bar in said normal position, and a second stop means for limiting movement of the bar in the direction effective to bring about actuation of the switch.

References Cited in the file of this patent

UNITED STATES PATENTS

| | | |
|---|---|---|
| 2,353,748 | Nordquist | July 18, 1944 |
| 2,528,912 | Rappaport et al. | Nov. 7, 1950 |
| 2,741,365 | Box et al | Apr. 10, 1956 |
| 2,742,993 | Hommell et al. | Apr. 24, 1956 |